(12) United States Patent (10) Patent No.: US 11,741,318 B2
Kotnis et al. (45) Date of Patent: Aug. 29, 2023

(54) OPEN INFORMATION EXTRACTION FROM LOW RESOURCE LANGUAGES

(71) Applicant: NEC Laboratories Europe GmbH, Heidelberg (DE)

(72) Inventors: Bhushan Kotnis, Heidelberg (DE); Kiril Gashteovski, Heidelberg (DE); Carolin Lawrence, Heidelberg (DE)

(73) Assignee: NEC CORPORATION, Tokyo (JP)

(*) Notice: Subject to any disclaimer, the term of this patent is extended or adjusted under 35 U.S.C. 154(b) by 276 days.

(21) Appl. No.: 17/342,575

(22) Filed: Jun. 9, 2021

(65) Prior Publication Data

US 2022/0309254 A1 Sep. 29, 2022

Related U.S. Application Data

(60) Provisional application No. 63/165,755, filed on Mar. 25, 2021.

(51) Int. Cl.
*G06F 40/58* (2020.01)
*G06F 40/295* (2020.01)
(Continued)

(52) U.S. Cl.
CPC ........... *G06F 40/58* (2020.01); *G06F 40/284* (2020.01); *G06F 40/295* (2020.01); *G06F 40/49* (2020.01); *G06N 3/08* (2013.01)

(58) Field of Classification Search
CPC ...... G06F 40/58; G06F 40/284; G06F 40/295; G06F 40/49; G06N 3/08; G06N 3/045; G06N 5/022
See application file for complete search history.

(56) References Cited

U.S. PATENT DOCUMENTS 8,645,289 B2 2/2014 Bennett et al.
9,779,085 B2 10/2017 Wick et al.
(Continued)

FOREIGN PATENT DOCUMENTS

CN 110008467 A 7/2019
CN 111581988 A 8/2020
(Continued)

OTHER PUBLICATIONS

Karunanayake, Y., Thayasivam, U., & Ranathunga, S. (Jul. 2019). Transfer learning based free-form speech command classification for low-resource languages. In Proceedings of the 57th Annual Meeting of the Association for Computational Linguistics: Student Research Workshop (pp. 288-294). (Year: 2019).*
(Continued)

*Primary Examiner* — Bhavesh M Mehta
*Assistant Examiner* — Philip H Lam
(74) *Attorney, Agent, or Firm* — Leydig, Voit & Mayer, Ltd.

(57) ABSTRACT

A method is provided for extracting machine readable data structures from unstructured, low-resource language input text. The method includes obtaining a corpus of high-resource language data structures, filtering the corpus of high-resource language data structures to obtain a filtered corpus of high-resource language data structures, obtaining entity types for each entity of each filtered high-resource language data structure, performing type substitution for each obtained entity by replacing each entity with an entity of the same type to generate type substituted data structures, and replacing each entity with an equivalent a corresponding low-resource language data structure entity to generate code switched sentences. The method further includes generating an augmented data structure corpus, training a multi-head self-attention transformer model, and providing the unstruc-
(Continued)

tured low-resource language input text to the trained model to extract the machine readable data structures.

15 Claims, 8 Drawing Sheets

(51) Int. Cl.
  *G06N 3/08* (2023.01)
  *G06F 40/49* (2020.01)
  *G06F 40/284* (2020.01)

(56) References Cited

U.S. PATENT DOCUMENTS

| | | | | |
|---|---|---|---|---|
| 2012/0158621 | A1* | 6/2012 | Bennett | G06F 16/334 706/12 |
| 2016/0350288 | A1* | 12/2016 | Wick | G06F 40/44 |
| 2018/0307679 | A1* | 10/2018 | Duong | G06N 3/082 |
| 2019/0197119 | A1* | 6/2019 | Zhang | G06F 40/58 |

FOREIGN PATENT DOCUMENTS

| | | |
|---|---|---|
| CN | 111695361 A | 9/2020 |
| WO | WO 2018203147 A2 | 3/2019 |

OTHER PUBLICATIONS

Liu, Z., Winata, G. I., Lin, Z., Xu, P., & Fung, P. (Apr. 2020). Attention-informed mixed-language training for zero-shot cross-lingual task-oriented dialogue systems. In Proceedings of the AAAI Conference on Artificial Intelligence (vol. 34, No. 05, pp. 8433-8440). (Year: 2020).*
Song, C. H., Lawrie, D., Finin, T., & Mayfield, J. (2020). Improving neural named entity recognition with gazetteers. arXiv preprint arXiv:2003.03072. (Year: 2020).*
Bustamante, G., Oncevay, A., & Zariquiey, R. (May 2020). No data to crawl? monolingual corpus creation from PDF files of truly low-resource languages in Peru. In Proceedings of the Twelfth Language Resources and Evaluation Conference (pp. 2914-2923). (Year: 2020).*
Magueresse, A., Carles, V., & Heetderks, E. (2020). Low-resource languages: A review of past work and future challenges. arXiv preprint arXiv:2006.07264. (Year: 2020).*
Yao, L., Mao, C., & Luo, Y. (2019). KG-BERT: BERT for knowledge graph completion. arXiv preprint arXiv:1909.03193. (Year: 2019).*
Dai, X., & Adel, H. (2020). An analysis of simple data augmentation for named entity recognition. arXiv preprint arXiv:2010.11683. (Year: 2020).*
Ro, Youngbin, Yukyung Lee, and Pilsung Kang. "Multi2OIE: Multilingual Open Information Extraction based on Multi-Head Attention with BERT," arXiv preprint arXiv:2009.08128, Oct. 7, 2020, US, pp. 1-11.
Kolluru, Keshav, et al. "OpenIE6: Iterative Grid Labeling and Coordination Analysis for Open Information Extraction." arXiv preprint arXiv:2010.03147, US, Oct. 7, 2020, pp. 1-14.
Moussallem, Diego et al. "Augmenting Neural Machine Translation with Knowledge Graphs," arXiv:1902:08816, arXiv, US, Feb. 23, 2019, pp. 1-12.
Lee, Woong-Ki et al. "Open Information Extraction for SOV Language based on Entity-Predicate Pair Detection," Proceedings of COLING 2012: Demonstration Papers, pp. 305-312, COLING 2012, Mumbai, India, Dec. 2012.
Gaspers, Judith, "Training a Machine Learning Model in English Improves Its Performance in Japanese," May 13, 2019, amazon science, US, pp. 1-10.
Vashistha, Neeraj and Arkaitz Zubiaga, "Online Multilingual Hate Speech Detection: Experimenting with Hindi and English Social Media," Dec. 2020, Information (Switzerland) 12(1):5, pp. 1-16.
Vougiouklis, Pavlos et al. "Neural Wikipedian: Generating Textual Summaries from Knowledge Base Triples," Elsevier B.V., Netherlands, Jul. 30, 2018, pp. 1-15.
Luo, Gong-Xu et al. "A Joint Back-Translation and Transfer Learning Method for Low-Resource Neural Machine Translation," Mathematical Problems in Engineering, Hindawi, UK, May 31, 2020, pp. 1-11.
Zhu, Qiannan et al. "Neighborhood-Aware Attentional Representation for Multilingual Knowledge Graphs," Proceedings of the Twenty-Eighth International Joint Conference on Artificial Intelligence (IJCAI-19), Aug. 10-16, 2019, Macao, China, pp. 1943-1949.
Zhao, Yu et al. "Embedding Learning with Triple Trustiness on Noisy Knowledge Graph," Entropy 2019, 21, 1083, Nov. 6, 2019, MDPI, Switzerland, pp. 1-16.

* cited by examiner

OPEN INFORMATION EXTRACTION FROM LOW RESOURCE LANGUAGES

CROSS-REFERENCE TO RELATED APPLICATION

Priority is claimed to U.S. Provisional Application No. 63/165,755, filed on Mar. 25, 2021, the entire disclosure of which is hereby incorporated by reference herein.

FIELD

The present invention relates to artificial intelligence and machine learning and, in particular, to a method, system and computer-readable medium for extracting information, in the form of a machine-readable data structure, from low resource languages using transfer learning from one or more high resource languages.

BACKGROUND

The technical challenge of extracting structured data in the form of (subject, verb, object) triples from unstructured text has taken on importance in the area of intelligence and machine learning applications due to the widespread proliferation of applications such as knowledge graph creation, document summarization, link prediction and question answering. One example of such an application is extracting news events and facts from news articles in the form of a knowledge graph and using link prediction for inferring additional information. Existing open information extraction (OpenIE) methods have predominantly focused on the English language using supervised and unsupervised methods. Ro, Youngbin, et al., "Multi²OIE: Multilingual Open Information Extraction based on Multi-Head Attention with BERT," arXiv preprint arXiv:2009.08128 (Oct. 7, 2020) and Kolluru, Keshav, et al., "OpenIE6: Iterative Grid Labeling and Coordination Analysis for Open Information Extraction," arXiv preprint arXiv:2010.03147 (Oct. 7, 2020), each of which are hereby incorporated by reference herein, describe some existing Open IE methods.

SUMMARY

According to an embodiment, a method is provided for extracting machine readable data structures from unstructured, low-resource language input text. The method includes obtaining a corpus of high-resource language data structures, filtering the corpus of high-resource language data structures to obtain a filtered corpus of high-resource language data structures, obtaining entity types for each entity of each filtered high-resource language data structure, performing type substitution for each obtained entity by replacing each entity with an entity of the same type to generate type substituted data structures, and replacing each entity with an equivalent a corresponding low-resource language data structure entity to generate code switched sentences. The method further includes generating an augmented data structure corpus comprising combining the type substituted data structures and code switched sentences with the filtered high-resource language data structure corpus, training, using the augmented data structure corpus, a multi-head self-attention transformer model with dynamic iterative tagging and a gradient descent algorithm, and providing the unstructured low-resource language input text to the trained multi-head self-attention transformer model to extract the machine readable data structures.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
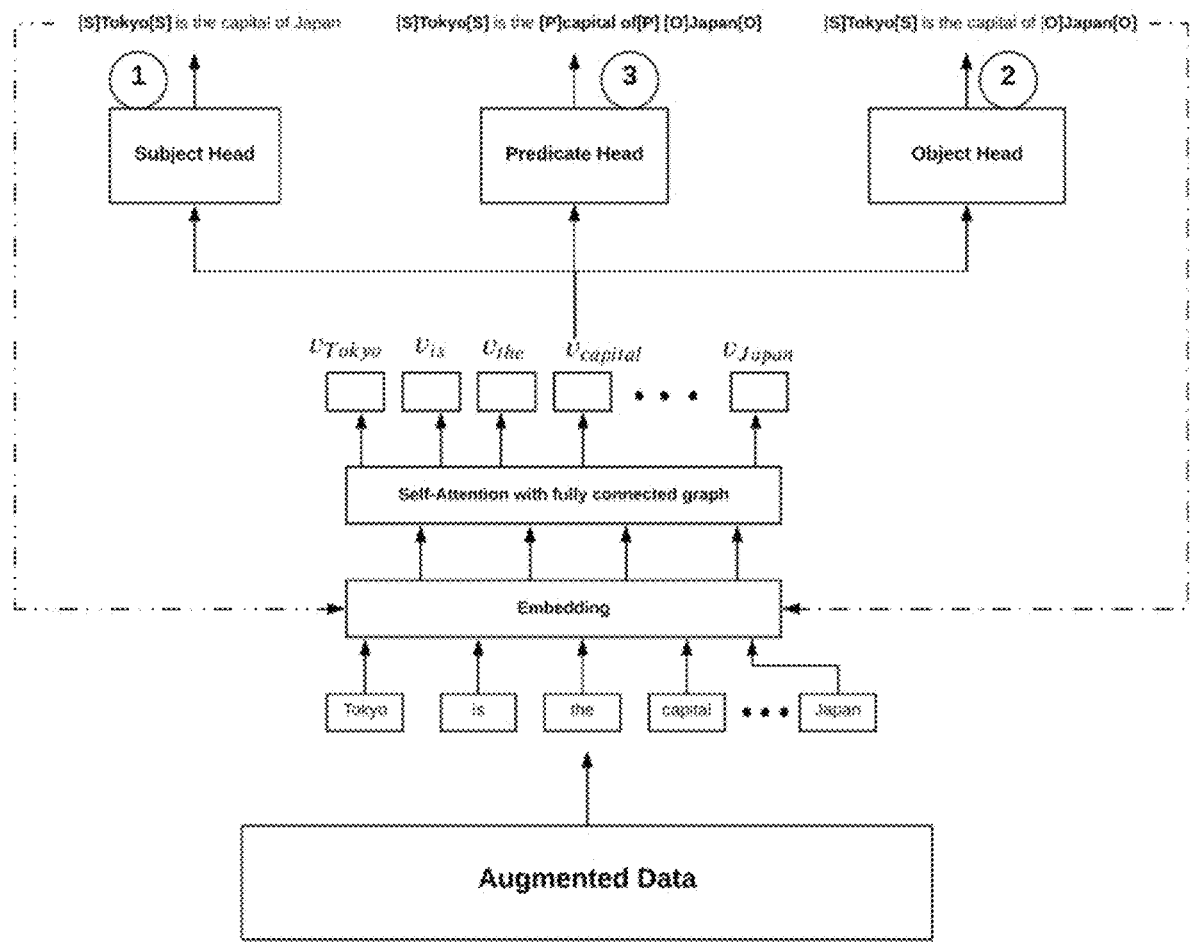
FIG. 1 schematically illustrates a method and system for extracting triples from an input sentence according to an embodiment of the present invention.

Embodiments of the present invention provide a method, system and computer-readable medium for extracting information in the form of machine-readable data structures, e.g. (subject, verb, object) triples, from unstructured, low resource language (e.g., Japanese, Korean, Hindi, etc.) text. The methods, systems, and computer-readable media described herein employ transfer learning from high resource languages (e.g., English) by utilizing data augmentation and iterative head prediction techniques. In contrast to existing approaches, the techniques described herein are the first to leverage code-switched data along with type switching and augmented conjunctions to enable linguistic transfer from high resource languages to low resource languages. Code-switched data refers to unstructured text and/or structured data that includes entities from multiple languages. For example, a code-switched sentence is a sentence that contains entity words from more than one language, e.g. "$M_{ocKBa}$ is the capital of Россия" and "Wien is the capital of Österreich" are examples of code switched sentences. Type-switched data refers to sentences where entities are switched with other entities of the same type. For example, "London is the capital of Russia" is a type-switched sentence where the entity "Moscow" has been switched with a different entity (i.e. "London") of the same type (e.g. the type "city"). Similarly, (London, is capital of, Russia) is a type-switched data structure where the entity "Moscow" has been switched with the entity "London." Augmented conjunctions refer to sentences where additional entities are using conjunctions. For example, starting with the unstructured text "Rhine flows through Karlsruhe," additional entities could be added thereto in order to obtain the augmented conjunction "Rhine flows through Karlsruhe and Mannheim and Frankfurt and Berlin." The original unstructured text is augmented by entities belonging to the same type (e.g. the type "city") using conjunctions.

Due to lack of training data and linguistic expertise, OpenIE (i.e. Open Information Extraction) methods have not been developed for low resource languages. However, the techniques described herein enable data from high resource languages, such as English, to be leveraged in order to transfer linguistic knowledge to low resource languages. In particular, methods described herein use inventive data augmentation and iterative head tagging procedures to accurately extract triples from low resource language text without the need for training a model with low resource language training data. The ability to extract information in the form of machine-readable data structures, e.g. (subject, verb, object) or (subject, predicate, object) triples, from unstructured low resource language text without the need for training data in the low resource language represents a significant technological advancement since training data in the low resource language is typically not available.

According to a first aspect, a method for extracting machine readable data structures from unstructured, low-resource language input text is provided. The method includes obtaining a corpus of high-resource language data structures, filtering the high-resource language data structures to obtain a filtered corpus of high-resource language data structures, and obtaining entity types for each entity of each filtered high-resource language data structure. The method further includes performing type substitution for each obtained entity by replacing each entity with an entity of the same type to generate type substituted data structures, replacing each entity with an equivalent low-resource language data structure to generate code switched sentences, and generating an augmented data structure corpus comprising combining the type substituted data structures and code switched sentences with the filtered high-resource language data structure corpus. In addition, the method includes training, using the augmented data structure corpus, a multi-head self-attention transformer model with dynamic iterative tagging and a gradient descent algorithm and providing the unstructured low-resource language input text to the trained multi-head self-attention transformer model to extract the machine readable data structures.

Implementations of the method for extracting machine readable data structures from unstructured, low-resource language input text can include obtaining a corpus of high-resource language (subject, verb, object) triples and then filtering out certain triples to obtain a filtered corpus of triples. The method further includes obtaining, for each entity in each respective triple of the filtered corpus of triples, an entity type. An entity type can be any taxonomic rank or level of classification defined to which the entity (i.e. a linguistic unit) belongs, e.g., a class/subclass/grouping/etc. For example, for the linguistic unit "Amazon," the types "river," "body of fresh water," "flowing body of water," and "body of water" could be obtained.

Thereafter, the method includes performing a type substitution procedure whereby entities of the triples of the filtered corpus of triples are replaced with entities of the same type in order to obtain type substituted triples. For example, (subject, predicate, object) triples—which constitute a pair of arguments (i.e. the subject and the object) and a relation between the arguments (i.e. the predicate), the arguments are replaced with other arguments of the same type in order to obtain the type substituted (subject, predicate, object) triples. For example, the type substitution procedure could involve generating, from the high-resource language triples (Alps, are located in, Europe) and (London, is capital of, United Kingdom), the type-substituted triples (Alps, are located in, Africa), (Himalayas, are located in, North America), (Andes, are located in, Europe) and the type-substituted triples (Mexico City, is capital of, United Kingdom), (Moscow, is capital of, China), and (London, is capital of, Germany). In each case, the type-substitution procedure involves replacing an entity (e.g. "Alps") of a triple, for which an entity type (e.g. "mountain ranges") has been obtained, with another entity of the same type (e.g. "Himalayas" or "Andes"). During the training phase of the subsequently described transformer model, it does not matter whether the relation between the arguments of any particular triple are true or false. The ability of the transformer model to extract coherent triples during a subsequent operation phase will be improved by adding any valid relation—regardless of whether true or false.

The method additionally includes replacing entities with their equivalent, low-resource language name in order to obtain code switched sentences. For example, starting with the triples (Vienna, is capital of, Austria) and (Moscow, is capital of, Russia), the code-switched sentences "Москва is the capital of Россия" and "Wien is the capital of Österreich" can be obtained. Similarly, the code-switched sentence "Wien is the capital of Deutschland" could be obtained from the type-switched data structure (Vienna, is capital of, Germany).

Once the type-substituted triples and the code-switched sentences are obtained, they are added to the filtered corpus so as to provide an augmented corpus of data structures. Notably, the augmented corpus of data structures includes both high-resource language data structures, e.g. high-resource language (subject, verb, object) triples, and low-resource language data structures, e.g. low-resource language (subject, verb, object) triples. After the augmented corpus of data structures is obtained, the method according to the first aspect further includes training, by using the augmented corpus of data structures, a multi-head self-attention transformer model with dynamic, iterative tagging using a gradient descent algorithm, e.g. a stochastic gradient descent algorithm. In brief, in order to train the multi-head self-attention transformer model, a corpus of high-resource language data structures is obtained, type-switching is performed to provide type-switched data structures, and then code-switched unstructured text is produced from the type-switched data structures. Then the code-switched unstructured text is provided, along with provenance sentences corresponding to the high-resource language triples, as training data. In order to assess the output of the transformer model during training, the type-switched data structures and the original high-resource language data structures are used.

Finally, after the training, the method includes breaking unstructured input text— including high-resource language text, low-resource language text, or a combination thereof— into sentences and inputting the sentences into the trained model in order to extract the machine readable data structures, e.g. (subject, verb, object triples), from the unstructured input text.

The method for extracting low-resource language (subject, predicate, object) triples from either high or low-resource language unstructured input text therefore includes the steps of augmenting high-resource language data, training a multi-head self-attention transformer model using the augmented high-resource language data, and inputting the unstructured input text into the trained multi-head self-attention transformer model.

The high-resource language triples can be obtained from at least one open information exchange (OIE) system, e.g. a publically available corpus. The entity types obtained for each of the filtered high-resource language data structures can also be obtained from such an open information exchange system.

The training of the multi-head self-attention transformer model includes the steps of inputting, into the multi-head self-attention transformer model, the augmented data structure corpus, including the high-resource language triples of the augmented data structure corpus, and dynamically and iteratively tagging the tokens using multiple tagging heads. Following the tagging, the weights of the multi-head self-attention transformer model are, e.g., updated using the gradient descent algorithm. The input to the transformer during training is the sentences from the augmented dataset (i.e. the code-switched unstructured text and provenance sentences corresponding to high-resource language triples) along with the tags, and the output during the training stage is the trained model obtained using the gradient descent optimization. The weights of the multi-head self-attention transformer model are, e.g., updated using the gradient descent algorithm and cross-entropy loss during the training—which can be, e.g., performed for the entire training dataset multiple times until an obtained score, e.g., F1 score, on a validation dataset does not improve.

Providing the unstructured high-resource language and/or low-resource language text to the trained multi-head self-attention transformer model includes separating the high-resource language and/or low-resource language text into individual high-resource language and/or low-resource language sentences, and inputting the individual sentences into the trained multi-head self-attention transformer model to obtain machine readable data structures, e.g. (subject, verb, object) triples.

The high-resource language triples of the corpus of high-resource language data structures have fields, i.e. for subject, verb, and object, that each correspond to a particular entity type. The entity type of each field of each triple can be obtained from the OIE system from which the triples are obtained. The open information exchange systems include internet databases, data sets, and knowledge bases, which include data in the form of open data, linked data, or linked open data.

According to an embodiment of the method, the high-resource language data structures comprise subject, verb, object triples, the entity types for each entity of the filtered high-resource language data structures are obtained from at least one open information exchange (OIE) system, and the augmented data structure corpus comprises high-resource language and low-resource language data structures. The entity types for the high-resource language data structures can, e.g., include subject and object classifiers. The at least one OIE system can, e.g., include open data, linked data, or linked open data databases.

According to an embodiment of the method, training the multi-head self-attention transformer model includes updating, using a gradient descent algorithm and cross-entropy loss, weights of the multi-head self-attention transformer model, and repeating the updating multiple times until an obtained score on a validation dataset does not improve. Updating the weights of the transformer model can include, e.g., performing dynamic iterative tagging that includes tagging an initial token head tagging of a subject, verb, or object token head of the high-resource language triples, then tagging another of the subject, verb, and object token heads, and then tagging a remaining token head of the subject, verb, or object token heads. The order of the dynamic head token tagging of the high-resource language triples is performed dynamically using entropy. The entropy measures the prediction-accuracy confidence of a head token from a minimum to a maximum using a softmax operation, and determining the order of the head token tagging is performed by aggregating only over head tokens that result in a positive head token tag of the high-language resource triples. After performing the dynamic head token tagging using a first dynamic prediction order, at least one additional dynamic head token tagging of the high-resource language triples is performed using another dynamic prediction order, wherein the triples predicted by multiple performed dynamic prediction orders are marked as high confidence triples. The dynamic head token tagging order can be chosen randomly.

According to an embodiment of the method, providing the unstructured low-resource language input text to the trained multi-head self-attention transformer model includes separating the unstructured low-resource language input text into individual low-resource language sentences, and inputting the individual low-resource language sentences into the trained multi-head self-attention transformer model to obtain subject, verb, object triples.

According to an embodiment of the method, training of the multi-head self-attention model generates a monolingual and/or multilingual knowledge graph linking entities. According to an embodiment of the method, the unstructured low-resource language input text is a code mixed sentence, said code mixed sentence comprising a sentence with mixed languages. According to an embodiment of the method the unstructured low-resource language input text comprises text of a first low-resource language and the extracted machine readable data structures comprise data structures for the first low-resource language.

According to a second aspect, the present disclosure describes a non-transitory computer readable medium having stored thereon instructions for performing a method for extracting machine readable data structures from unstructured, low-resource language input text is provided. The method includes obtaining a corpus of high-resource language data structures, filtering the high-resource language data structures to obtain a filtered corpus of high-resource language data structures, and obtaining entity types for each entity of each filtered high-resource language data structure. The method further includes performing type substitution for each obtained entity by replacing each entity with an entity of the same type to generate type substituted data structures, replacing each entity with an equivalent low-resource language data structure to generate code switched sentences, and generating an augmented data structure corpus comprising combining the type substituted data structures and code switched sentences with the filtered high-resource language data structure corpus. In addition, the method includes training, using the augmented data structure corpus, a multi-head self-attention transformer model with dynamic iterative tagging and a gradient descent algorithm and providing the unstructured low-resource language input text to the trained multi-head self-attention transformer model to extract the machine readable data structures.

According to a third aspect, the present disclosure provides a system for extracting machine readable data structures from unstructured, low-resource language input text is provided. The system includes one or more processors configured to obtain a corpus of high-resource language data structures, filter the high-resource language data structures to obtain a filtered corpus of high-resource language data structures, and obtain entity types for each entity of each filtered high-resource language data structure. The one or more processors are further configured to perform type substitution for each obtained entity by replacing each entity with an entity of the same type to generate type substituted data structures, replacing each entity with an equivalent low-resource language data structure to generate code switched sentences, and generating an augmented data structure corpus comprising combining the type substituted data structures and code switched sentences with the filtered high-resource language data structure corpus. In addition, the one or more processors are configured to train, using the augmented data structure corpus, a multi-head self-attention transformer model with dynamic iterative tagging and a gradient descent algorithm and provide the unstructured low-resource language input text to the trained multi-head self-attention transformer model to extract the machine readable data structures.

FIG. 1 schematically illustrates a method and system for extracting triples using augmented data from a data augmentation method according to embodiments of the present invention and discussed further below. The system is based on an OpenIE extraction model that has a self-attention-based neural sequence model, such as a transformer model, with three token classification heads, namely, the subject head, the predicate head and the object head. A token classification head is a dense (linear) layer followed by a softmax operation applied on all tokens of the input sentence.

The input sentence is given to the self-attention-based neural sequence model, such as a transformer model, and the model converts the input sentence to a sequence of embeddings, each embedding corresponding to a word in the sentence. After the embeddings are obtained at the output layer, the three token classification heads are applied dynamically. FIG. 1 provides an example of one such input sequence for an input sentence. First, the subject head is applied which marks all the subjects in the input sentence. For each marked subject, the same input sentence with the marked subject is fed to the model and is then given to another token classification head, such as the object head. The object head marks the object and, now having the marked subject and object, the input sentence is fed again to the model for tagging the predicate.

According to an embodiment of the present invention, the order of the token classification heads is chosen dynamically using a variety of metrics, such as entropy (e.g., the head prediction is ordered by the entropy (a measure of how confident the respective token classification head is in its predictions) from minimum to maximum). The entropy, i.e. the Shannon entropy, of a token classification head is computed by aggregating only over tokens that result in a positive label (either subject, object or predicate). The entropy is computed, e.g., using the softmax output from the output heads where each head has three classes and then using the Shannon entropy equation. After extracting the triples using one prediction order, the sentence is input again to the model which extracts the triples using a different prediction order. This is preferably done multiple times, and the order is preferably chosen randomly. The triples predicted by multiple prediction orders are marked as high confidence triples.

In the example of FIG. 1, the input sentence from augmented data is passed to the transformer model. The augmented data includes, e.g., high-resource language data structures (for example, (subject, predicate, object) triples) and provenance sentences corresponding to such data structures, as well as type-switched/code-switched data structures and unstructured language text. The model maps each word in the input sentence to an embedding vector, and then applies self-attention. The application of self-attention utilizes a fully connected graph. The fully connected graph is generated by multiplying every token vector with every other token vector. Each token vector is a vector that represents a word, and the token vectors are computed by first "tokenizing" text (splitting a sentence into words or tokens) and then mapping each word to a vector using matrix multiplication.

Figure 7:
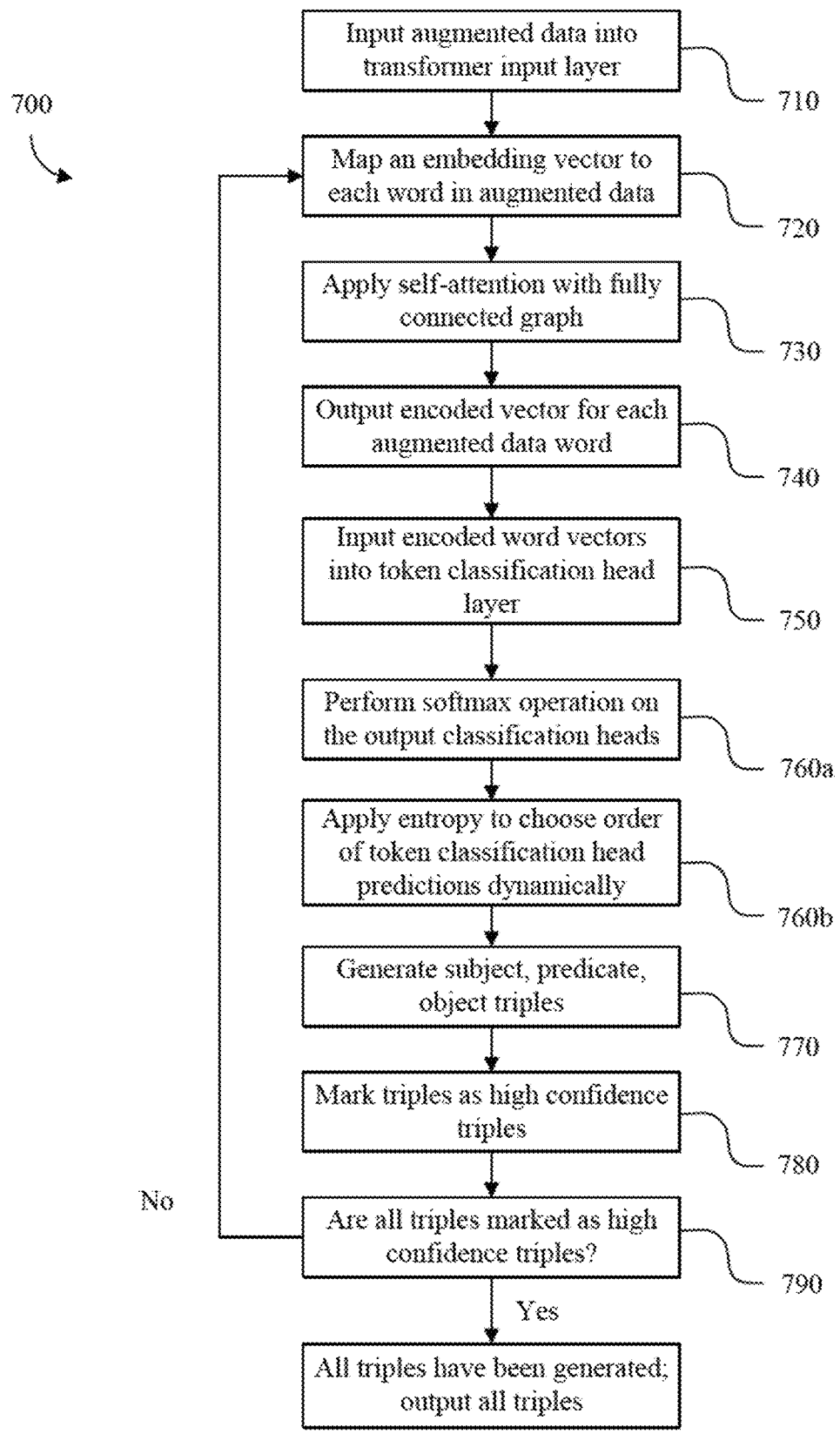
FIG. 7 illustrates a flow chart of the operation of a multi-head self-attention transformer model in the overall system according to an embodiment of the present invention.

The output of the self-attention layer of the transformer model is a vector representation v (i.e. an encoded vector) for each word. The sequence of vector representations is then passed to each of the three token classification heads for subject, predicate and object prediction. Based on the predictions, the system dynamically chooses one of the token classification heads and proceeds with this head's prediction. For each head, the entropy is computed (e.g., as discussed above) and the order of prediction is determined by choosing the head with the lowest entropy. The predictions of the token classification heads are output in the form of an actual word, while the entropy works on the softmax. Specifically, the softmax is applied on the output head, then entropy is computed, and then the order is chosen and the triples are predicted based on the order. The new sentence, where this token classification head marked all tokens it has predicted, is then input back to the model. The procedure is then repeated for the remaining two token classification heads. Feedback is provided during the training phase only, and is only provided for the classification head which tags the subject/object/predicate. The system does not wait for the entire triple to be tagged, but updates itself even if one of the heads tags the words FIG. 7 illustrates a flow chart 700 of the operation of a multi-head self-attention transformer model, such as that described in FIG. 1 above. First, at 710 augmented data, for example high-resource language sentence or text, is input into an input layer or encoder of the multi-head self-attention transformer model. Next, at 720, the input encoder maps each word of the inputted augmented data to a corresponding, individual embedding vector. Next, at 730, the transformer model applies self-attention to each embedding vector in order to provide encoded vectors. The transformer model utilizes a fully connected knowledge graph in performing this step. Next, at 740, the transformer model outputs encoded vectors, as a vector representation "v" for each embedded word, providing a set of encoded vectors for the inputted words of the augmented data.

Next, at step 750, the transformer model inputs the encoded word vectors into a token classification head layer, which is a dense (linear) layer of the transformer model. At a next step 760a, a softmax operation is performed on the output classification heads. In step 760b, an entropy metric is applied to dynamically choose an initial head token tagging order determining whether subject, predicate, or object token heads will be used to tag the encoded word vectors of, and generate subject, predicate, or object triples from, the inputted augmented data first. In this step, the head prediction is ordered by the entropy (a measure of how confident the head is in its predictions) from a minimum to a maximum. At a next step 770, subject, predicate, or object triples are generated from this first token classification head tagging sequence. Then, at step 780, subject, predicate, or object triples are generated from the tagged token heads and marked as high-confidence triples. Finally, at step 790, the transformer model re-inputs the augmented data with the token-head tagged, subject, predicate, or object triples into the transformer model perform the above described operation again, iteratively, to generate the remaining subject, predicate, or object triples—this operation may be performed multiple times, and in randomly selected, different orders, and the operation may be performed in this manner multiple times for each (subject, predicate, object) triple type until all triples and triple types have been tagged and generated. Once all triples have been generated, they are outputted. The data augmentation method for obtaining the augmented data according to an embodiment of the present invention comprises two parts: 1) selecting OpenIE triples in English with disambiguated arguments (see FIG. 2), and 2) using the English OpenIE triples to generate OpenIE triples with a low resource language, e.g. Japanese arguments (see FIG. 3).

Figure 2:
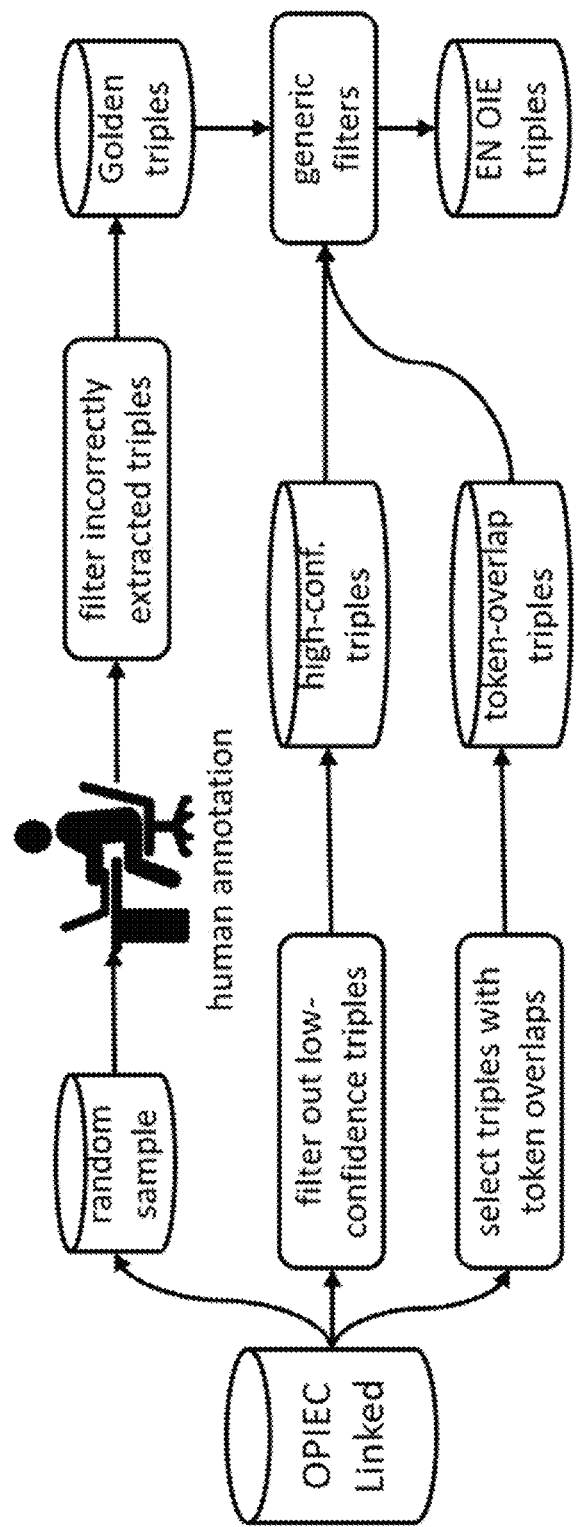
FIG. 2 schematically illustrates a method and system for selecting triples in English that have disambiguated arguments according to an embodiment of the present invention.
Figure 3:
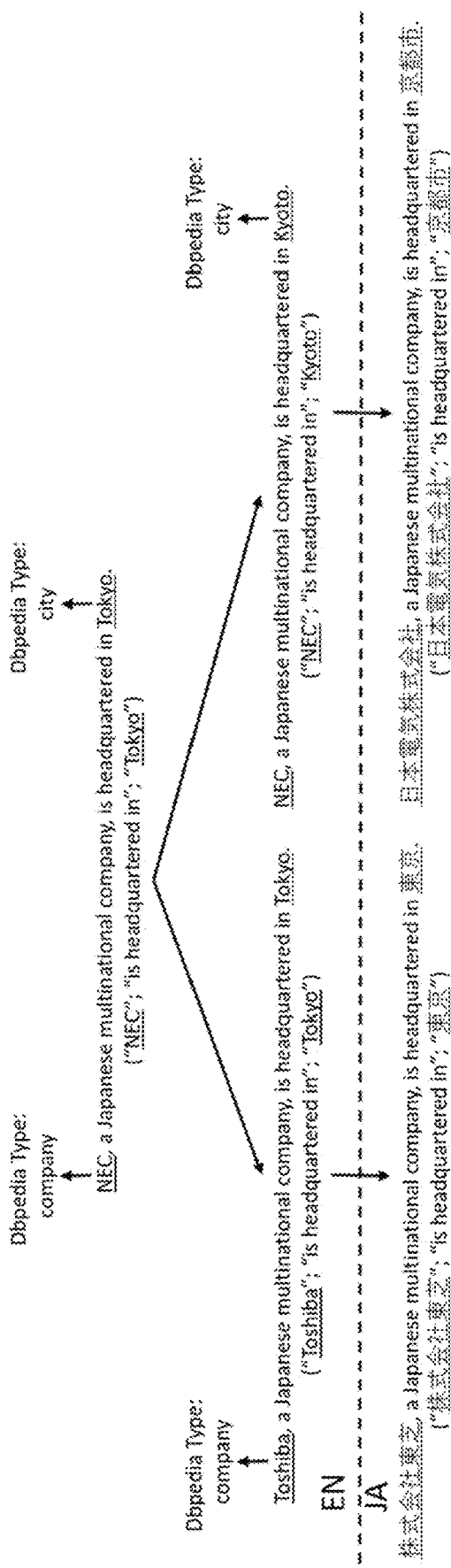
FIG. 3 shows an example of an augmented triple for both the subject and the object.

FIG. 2 schematically illustrates a method and system for selecting OpenIE triples in English with disambiguated arguments starting from the publicly available OpenIE corpus. This OpenIE corpus is assumed to contain OpenIE triples with disambiguation IDs for the arguments. The disambiguation IDs are in fact unique Wikipedia URLs. Therefore, such disambiguation links can be directly mapped to any Wikipedia-generated knowledge graph (e.g., DBpedia, YAGO or WikiData). Moreover, such links can be directly mapped to entity mentions (e.g., the link Joe_Biden can be rewritten as a string: "Joe Biden"). Next, embodiments of the present invention utilize several subsets of the OpenIE corpus: 1) golden triples, 2) high-confidence triples, and 3) token-overlap triples. The golden triples are triples marked by a human. For this, a random sample of OpenIE triples is first retrieved. Then, a human annotator labels them as either "correctly extracted" or "incorrectly extracted". Embodiments of the present invention then select only the correctly extracted triples. Although the use of golden triples can be advantageous, the human annotation step is not required to be able to extract triples in accordance with embodiments of the present invention. High-confidence triples are triples with a confidence score >0.95. The confidence score is obtained from the OpenIE system that generates the OpenIE corpus. The token-overlap triples contain all the tokens from the original sentence (i.e., the tokens from the provenance sentence overlap with the tokens from the triple if we assume that both the triple and the sentence are bags of words).

According to an embodiment, all triples from the publicly available corpus are collected and "generic filters" are applied on them. Generic filters are filters that remove triples that: 1) have no entity types in DBpedia for both arguments, or 2) have the generic entity type "Thing" in DBpedia for at least one of the arguments and no arguments for the other argument. Duplicates are filtered out.

Figure 4:
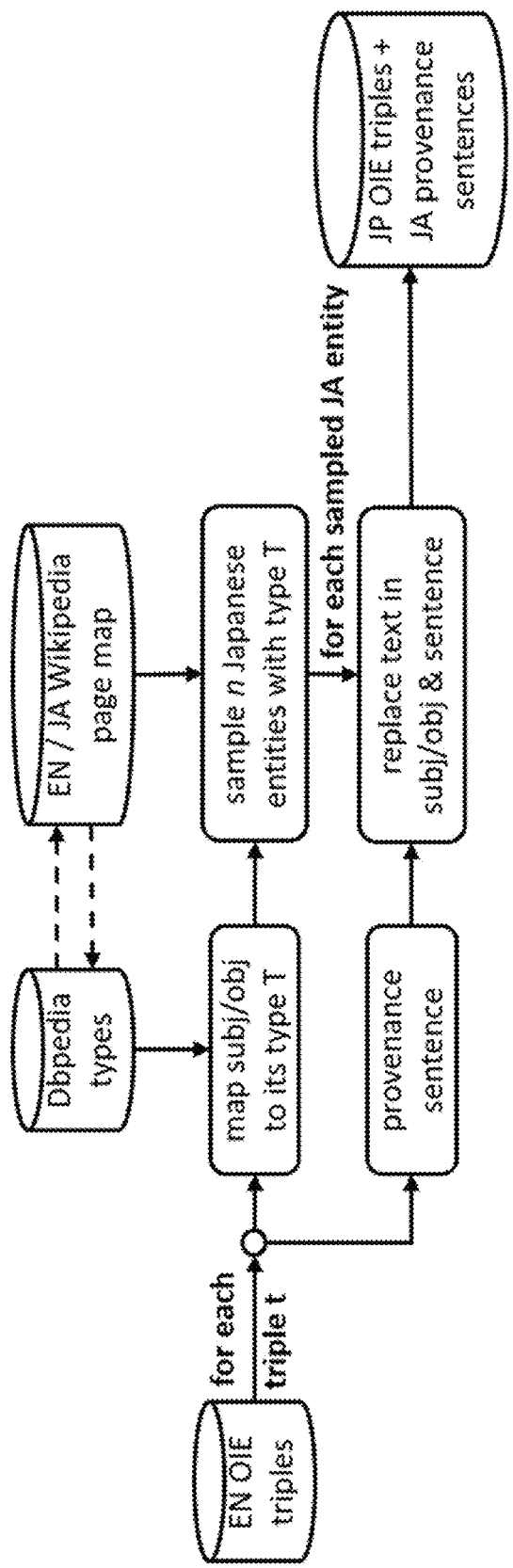
FIG. 4 schematically illustrates a method and system for generating augmented data from high resource language triples according to an embodiment of the present invention.
Figure 5:
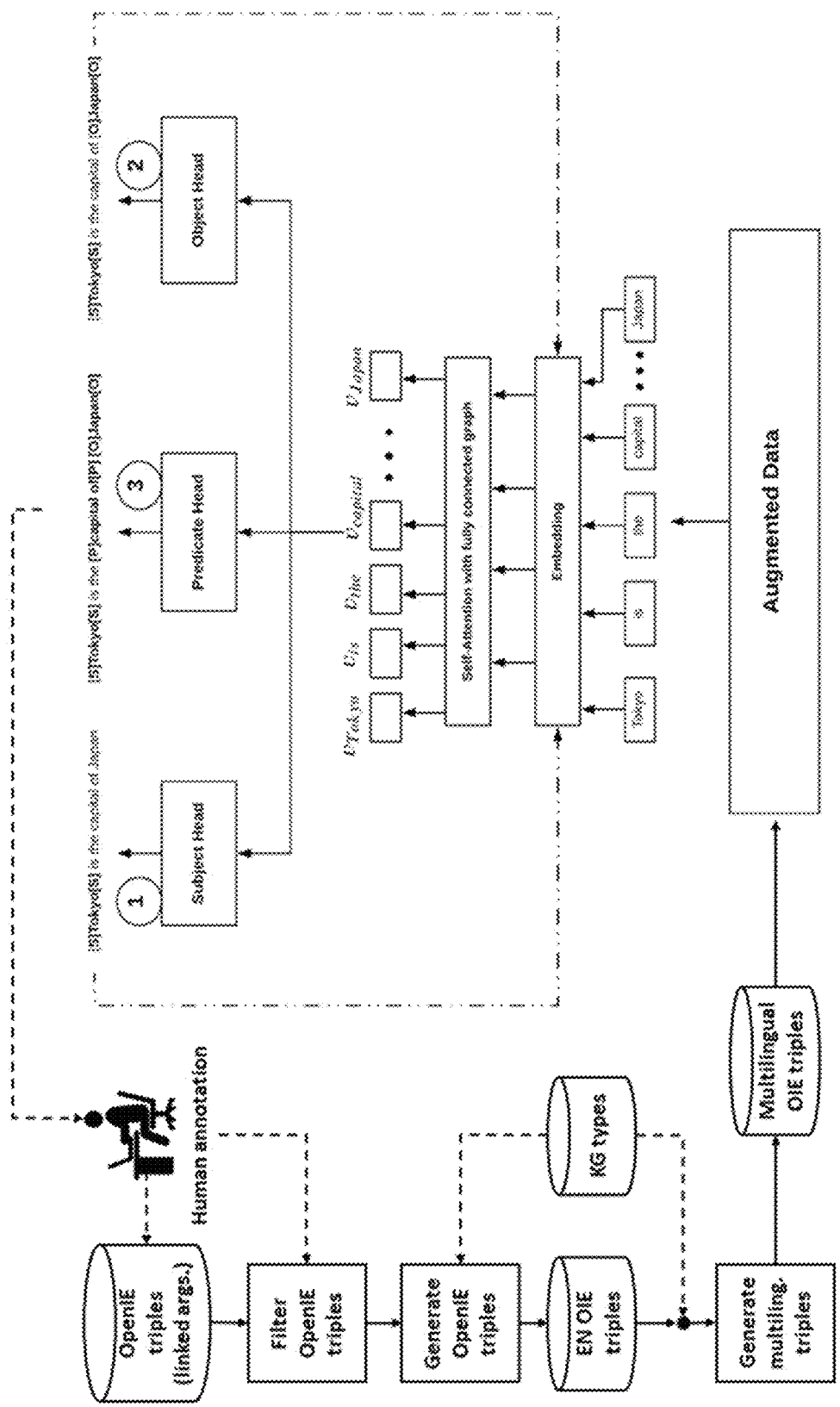
FIG. 5 schematically illustrates a combined method and system for generating the augmented data and using the augmented data for extracting the triples according to an embodiment of the present invention.

In the example of FIG. 4, augmented data is generated from English OpenIE triples. With this process, every respective OpenIE triple and its provenance sentence (i.e. the unstructured text/natural language sentence from which the respective OpenIE triple has been extracted) is converted into a triple-sentence pair. Once the triple-sentence pairs are provided, type substitution can be performed whereby one or more entities of each triple-sentence pair is substituted with another entity of the same type. Thereafter, code-switching is performed in which entities from a high-resource language are replaced with entities from a low-resource language. The process starts with each triple of the English OpenIE triples. Then, for the subject of each respective triple of the English OpenIE triples, n (e.g. 3 or 4) DBpedia entities are randomly sampled that have: 1) the same entity type, and 2) are available in low resource language DBpedia. Next, the text in the subject and in the provenance sentence is replaced with the low resource language text of the new entity of the subject (i.e. one of the n randomly sampled DBpedia entities having the same entity type of the subject and being available in the low resource language), as well as the old entity of the object (see FIG. 3). The same procedure is repeated for the object. Finally, we store the pair of low-resource language OpenIE triples and their provenance sentences are stored. This results in pairs of triples including low-resource language arguments and code-switched sentences, allowing the model to extract the triples in the low resource language.

Figure 8:
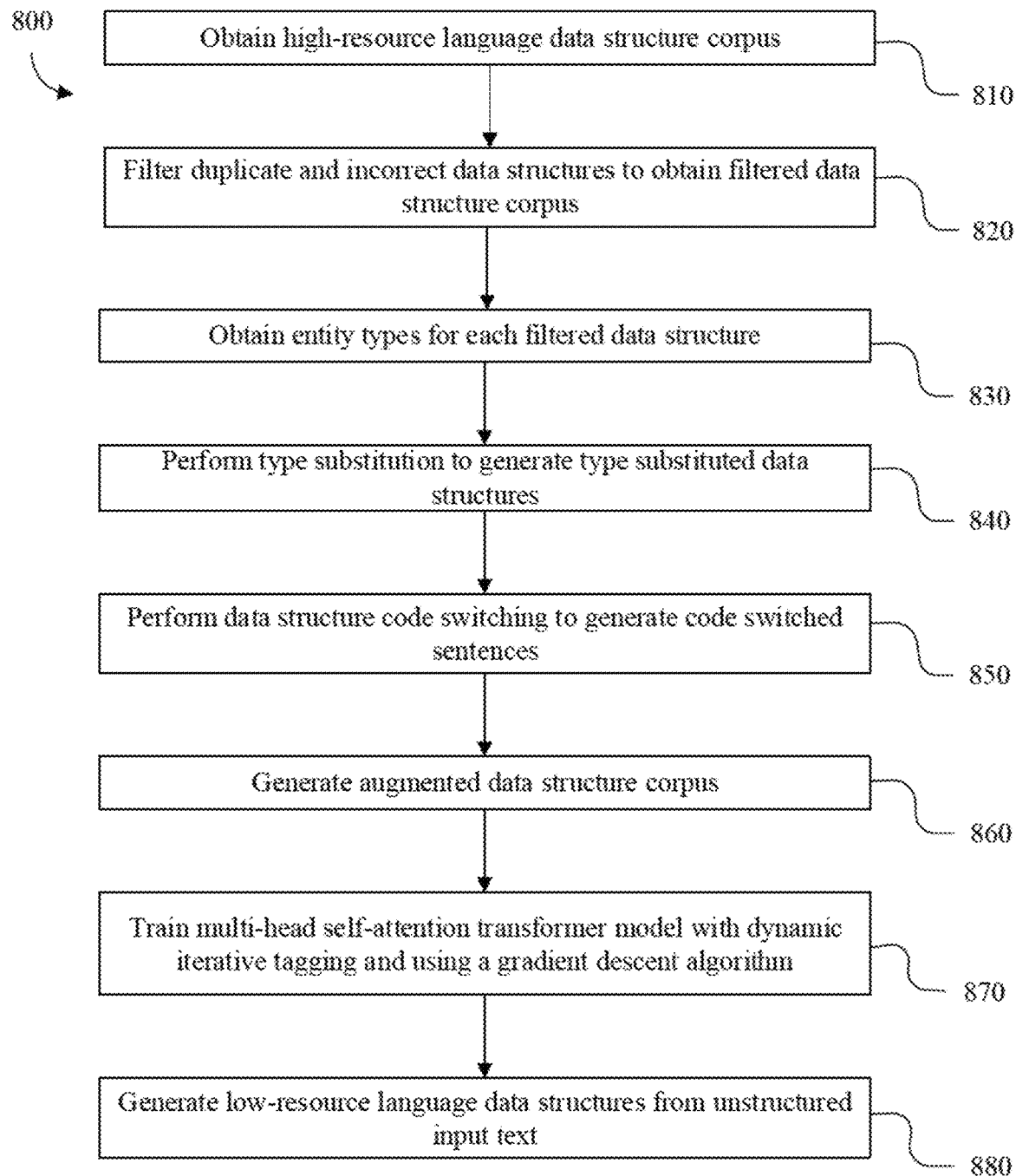
FIG. 8 illustrates a flowchart of a data method of extracting machine readable data structures from unstructured, low-resource language input text according to an embodiment of the present invention.

The flowchart 800 in FIG. 8 illustrates a method of extracting machine readable data structures from unstructured, low-resource language input text. In a first step 810 a corpus of high-resource language data structures, which include subject, predicate or verb, and object triples, is obtained. Next at a step 820, the high-resource language data structure corpus is filtered to filter out certain data structures, such as incorrectly extracted (e.g., head-token tagged) data structures, including triples, to obtain a filtered corpus of high-resource language data structures. Next at a step 830, an entity with a certain entity type is obtained for each entity in each respective data structure of the filtered corpus. Thereafter, at step 840, a type substitution procedure is performed whereby entities of the data structures of the filtered corpus are replaced with entities of the same type in order to obtain type substituted data structures. Next at a step 850, a data structure code switching process is performed which includes replacing the entities of each of the type substituted data structures with an equivalent, low-resource language entity, such as a word or name, in order to obtain code switched sentences. Next, at a step 860, after the type-substituted data structures and the code-switched sentences are obtained, they are added to the filtered corpus so as to provide a corpus of augmented data structures. After the augmented data structure corpus is obtained, at a step 870, a multi-head self-attention transformer model with dynamic, iterative tagging using a gradient descent algorithm is trained. Finally, at a step 880, unstructured input text in the form of sentences is input into the trained model and the machine readable data structures are extracted from the unstructured input text.

In an embodiment, the present invention can be applied for generating multilingual knowledge graphs, for example, of company data. In this particular embodiment, the method can be used for generating multilingual training data on English as well as low resource language text on company data, such as company investment documents and company information. The result is a knowledge graph linking companies, products, investments, assets, CEOs, assets, etc. The system will extract triples in different languages. Different languages allow the system to capture information from varied sources. This allows, e.g., a bilingual investment analyst to check how companies, products and assets are linked to each other for planning investment decisions.

In an embodiment, the present invention can be applied in a multilingual OpenIE system for public safety, for example, to provide an immigration checking system for border control at international airports, ports and railway crossings. Upon receiving the name and social media handles of the individual who wishes to either enter or leave the border, the system will invoke the multilingual OpenIE system which will extract triples from the social media feeds in different languages. The triples will be extracted to create a knowledge graph and automatically checked to contain terms that indicate if the person has ever supported, condoned or promoted violent and illegal activities. If so, the system could automatically bar the individual from entering or leaving the border and could alert a border guard for further processing. The technical advantage of the multilingual capability of the system is that it will enable the system to perform a thorough background check of the individual's social media feed in different languages, which was heretofore not possible.

In an embodiment, the present invention can be applied to identify hate speech in internet articles. Prevalence of hate speech is a huge problem on the Internet. Public authorities spend significant time and computational resources in identifying and removing hate speech. This sort of work is often done with the assistance of human workers, which is time consuming and may also psychologically impact the workers. In contrast, embodiments of the present invention provide to automatically extract triples from documents, articles and even social media to create a knowledge graph, and such extraction is possible in multiple languages. The triples in the knowledge graph can be either be automatically classified as promoting hate speech or can be shown to the hate speech filtering agent who now doesn't need to read the entire document, but rather only look at the triples and their connections to quickly determine whether it is hate speech or not. Using this system would save considerable time and computational resources, and associated costs.

Figure 6:
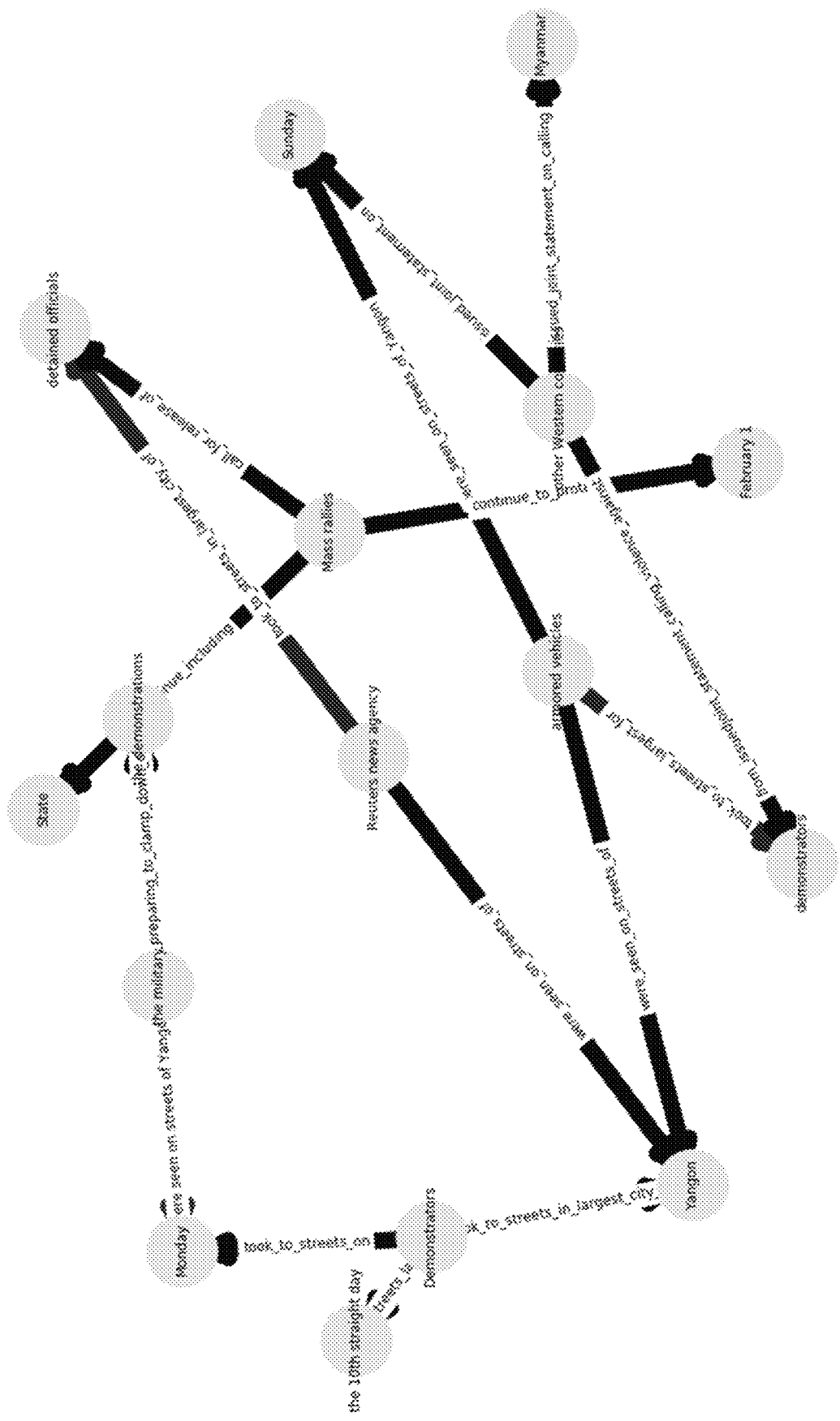
FIG. 6 graphically illustrates an exemplary application of an embodiment of the present invention to a news article.

In an embodiment, the present invention can be applied for summarizing texts, such as news articles. FIG. 6 illustrates an example application of summarizing Japanese news articles using an open knowledge graph and comparing the extracted triples. The task in this example is to extract a summary of a news articles related to geo-politics and then compare the extracted triples to triples extracted from other news articles to check which facts are common and which are not. Such a system could be used by an intelligence analyst to keep track of open source intelligence data obtained from publicly available news articles. The system presents the analyst with structured facts from a news article and how similar they are to facts from other news article, which results in increased accuracy in the task while saving significant time for the analyst by not requiring to manually read or process entire articles and allowing to skip articles which have similar facts.

In an embodiment, the present invention can be applied to extract a knowledge graph, for example, from financial news and company reports aiming to extract company information, company assets, sales, costs and shareholder value. The system will create a knowledge graph on how companies, products, assets, services are linked to each other. This will be used in a link prediction algorithm to predict how the company will perform in terms of its stock valuation in the future.

Embodiments of the present invention provide for the following improvements:
1. Using multi-head dynamic iterative procedure for extracting multilingual triples.
2. Data augmentation using code-switched data between high resource language and low resource language which facilitates transfer of knowledge from the high resource language to the low resource language.
3. Data augmentation using type substitution, which allows the model to extract entities in different languages.

In an exemplary embodiment in which the high resource language is English and the low resource language is Japanese, the present invention provides a method for extracting triples from input text comprising the following steps:
1. Filter Open IE triples from any publicly available OIE system.
2. From the filtered triples, obtain the entity types in DBPedia for each triple.
3. Replace entities (subject and object) with entities from the same type to obtain type substituted triples. Add these triples to the original filtered triples.
4. Replace entities (subjects and objects) with their Japanese name available in DBPedia to obtain code switched sentences. Add these triples to the original filtered triples.
5. Use the augmented data to train the multi-head self-attention model with dynamic iterative tagging using a gradient descent algorithm.
6. Break an English or Japanese document into sentences and input the sentences in the trained model and obtain the triples.

Accordingly, embodiments of the present invention enable to extract triples from text written in a low resource language, such as Japanese. There is no existing system which is able to extract subject, verb, object triples in low resource languages, such as Japanese. Moreover, embodiments of the present invention outperform current supervised and unsupervised English triple extraction systems due to additional augmented data and also due to the iterative head prediction method. Another improvement provided by embodiments of the present invention is the ability to handle code mixed sentences (i.e., sentences with mixed languages) and is able to it is able to extract triples even when the subject, object and predicate are in different languages. Moreover, embodiments of the present invention can accept sentences from over 100 languages with increased performance. For example, by the model being trained on code switched sentences, performance and accuracy is increased. Likewise, choosing the prediction heads dynamically also increases performance and accuracy.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While embodiments of the invention have been illustrated and described in detail in the drawings and foregoing description, such illustration and description are to be considered illustrative or exemplary and not restrictive. It will be understood that changes and modifications may be made by those of ordinary skill. In particular, the present invention covers further embodiments with any combination of features from different embodiments. Additionally, statements made herein characterizing the invention refer to an embodiment of the invention and not necessarily all embodiments.

What is claimed is:

1. A method of extracting machine readable data structures from unstructured, low-resource language input text, the method comprising:
   obtaining a corpus of high-resource language data structures,
   filtering the corpus of high-resource language data structures to obtain a filtered corpus of high-resource language data structures,
   obtaining entity types for each entity of each filtered high-resource language data structure,
   performing type substitution for each obtained entity by replacing each entity with an entity of the same type to generate type substituted data structures,
   replacing each entity with a corresponding low-resource language entity to generate code switched sentences,
   generating an augmented data structure corpus comprising combining the type substituted data structures and code switched sentences with the filtered high-resource language data structure corpus,
   training, using the augmented data structure corpus, a multi-head self-attention transformer model with dynamic iterative tagging and a gradient descent algorithm; and
   providing the unstructured low-resource language input text to the trained multi-head self-attention transformer model to extract the machine readable data structures.

2. The method of claim 1, wherein:
   the high-resource language data structures comprise subject, verb, object triples;
   the entity types for each entity of the filtered high-resource language data structures are obtained from at least one open information exchange (OIE) system; and
   the augmented data structure corpus comprises high-resource language and low-resource language data structures.

3. The method of claim 1, wherein training the multi-head self-attention transformer model comprises:
   updating, using a gradient descent algorithm and cross-entropy loss, weights of the multi-head self-attention transformer model, and
   repeating the updating multiple times until an obtained score on a validation dataset does not improve.

4. The method of claim 1, wherein providing the unstructured low-resource language input text to the trained multi-head self-attention transformer model further comprises:
   separating the unstructured low-resource language input text into individual low-resource language sentences; and
   inputting the individual low-resource language sentences into the trained multi-head self-attention transformer model to obtain subject, verb, object triples.

5. The method of claim 2, wherein the entity types for the high-resource language data structures comprise subject and object classifiers.

6. The method of claim 2, wherein the at least one OIE system comprises open data, linked data, or linked open data databases.

7. The method of claim 1, wherein the training of the multi-head self-attention model generates a monolingual and/or multilingual knowledge graph linking entities.

8. The method of claim 3, wherein updating the weights of the multi-head self-attention transformer model includes performing dynamic iterative tagging that includes tagging an initial token head tagging of a subject, verb, or object token head of the high-resource language triples, then tagging another of the subject, verb, and object token heads, and then tagging a remaining token head of the subject, verb, or object token heads.

9. The method of claim 3, wherein an order of dynamic head token tagging of the high-resource language triples is performed dynamically using entropy, wherein the entropy provides a measure of the prediction-accuracy confidence of a head token from a minimum to a maximum using a softmax operation; and
   wherein determining the order of the head token tagging is performed by aggregating only over head tokens that result in a positive head token tag of the high-language resource triples.

10. The method of claim 9, wherein after performing the dynamic head token tagging using a first dynamic prediction order, at least one additional dynamic head token tagging of the high-resource language triples is performed using another dynamic prediction order, wherein the triples predicted by multiple performed dynamic prediction orders are marked as high confidence triples.

11. The method of claim 9, wherein the dynamic head token tagging order is chosen randomly.

12. The method of claim 1, wherein the unstructured low-resource language input text is a code mixed sentence, said code mixed sentence comprising a sentence with mixed languages.

13. The method of claim 1, wherein the unstructured low-resource language input text comprises text of a first low-resource language and the extracted machine readable data structures comprise data structures for the first low-resource language.

14. A non-transitory computer readable medium having stored thereon processor executable instructions that, when executed by a processor, cause the processor to perform a method of extracting machine readable data structures from unstructured, low-resource language input text, the method comprising:
   obtaining a corpus of high-resource language data structures,
   filtering the corpus of high-resource language data structures to obtain a filtered corpus of high-resource language data structures,
   obtaining entity types for each entity of each filtered high-resource language data structure,
   performing type substitution for each obtained entity by replacing each entity with an entity of the same type to generate type substituted data structures,
   replacing each entity with a corresponding low-resource language entity to generate code switched sentences, generating an augmented data structure corpus comprising combining the type substituted data structures and code switched sentences with the filtered high-resource language data structure corpus, training, using the augmented data structure corpus, a multi-head self-attention transformer model with dynamic iterative tagging and a gradient descent algorithm; and providing the unstructured low-resource language input text to the trained multi-head self-attention transformer model to extract the machine readable data structures.

15. A system for extracting machine readable data structures from unstructured, low-resource language input text, the system comprising:
one or more processors configured to:
obtain a corpus of high-resource language data structures,
filter the corpus of high-resource language data structures to obtain a filtered corpus of high-resource language data structures,
obtain entity types for each entity of each filtered high-resource language data structure,
perform type substitution for each obtained entity by replacing each entity with an entity of the same type to generate type substituted data structures,
replace each entity with a corresponding low-resource language entity to generate code switched sentences,
generate an augmented data structure corpus comprising combining the type substituted data structures and code switched sentences with the filtered high-resource language data structure corpus,
train, using the augmented data structure corpus, a multi-head self-attention transformer model with dynamic iterative tagging and a gradient descent algorithm; and
provide the unstructured low-resource language input text to the trained multi-head self-attention transformer model to extract the machine readable data structures.

* * * * *